(12) United States Patent
Selvaraj

(10) Patent No.: US 8,223,363 B2
(45) Date of Patent: Jul. 17, 2012

(54) UNIVERSAL PRINT DRIVER WITH BEST FIT DISCOVERY

(75) Inventor: Senthil Selvaraj, Snoqualmie, WA (US)

(73) Assignee: Ricoh Company, Ltd., Tokyo (JP)

( * ) Notice: Subject to any disclaimer, the term of this patent is extended or adjusted under 35 U.S.C. 154(b) by 1150 days.

(21) Appl. No.: 11/700,693

(22) Filed: Jan. 30, 2007

(65) Prior Publication Data

US 2008/0180699 A1 Jul. 31, 2008

(51) Int. Cl.
*G06F 3/12* (2006.01)
*G06F 15/00* (2006.01)
*G06F 15/173* (2006.01)

(52) U.S. Cl. ........ 358/1.15; 358/1.13; 358/1.9; 709/223

(58) Field of Classification Search .................. None
See application file for complete search history.

(56) References Cited

U.S. PATENT DOCUMENTS

| | | | |
|---|---|---|---|
| 6,529,286 B1* | 3/2003 | King | 358/1.14 |
| 6,825,941 B1 | 11/2004 | Nguyen et al. | |
| 2002/0051204 A1* | 5/2002 | Ohara | 358/1.16 |
| 2002/0120742 A1* | 8/2002 | Cherry | 709/226 |
| 2002/0135798 A1* | 9/2002 | Simpson et al. | 358/1.15 |
| 2003/0090694 A1* | 5/2003 | Kennedy et al. | 358/1.13 |
| 2003/0231328 A1* | 12/2003 | Chapin et al. | 358/1.13 |
| 2004/0061890 A1* | 4/2004 | Ferlitsch | 358/1.15 |
| 2007/0233834 A1* | 10/2007 | Hattori et al. | 709/223 |

FOREIGN PATENT DOCUMENTS

| | | |
|---|---|---|
| EP | 1 178 392 | 2/2002 |
| JP | 9006557 A | 1/1997 |
| JP | 2001142665 A | 5/2001 |
| JP | 2001282492 A | 10/2001 |
| JP | 200330638 A | 11/2003 |
| JP | 2005071175 A | 3/2005 |
| JP | 2005228243 A | 8/2005 |

OTHER PUBLICATIONS

European Patent Office, "European Search Report", Foreign application No. 08150551.3/1245, dated Aug. 28, 2008, 6 pages.
Claims, Foreign application No. 08150551.3/1245, 5 pages.

(Continued)

*Primary Examiner* — King Poon
*Assistant Examiner* — Ming Hon
(74) *Attorney, Agent, or Firm* — Hickman Palermo Truong & Becker LLP; Edward A. Becker

(57) ABSTRACT

A universal print driver allows an application program to print to any printer available on a network without the user having to perform the configuration that is required in conventional printing arrangements. The universal print driver includes functionality for performing printing device discovery to determine printing devices that are available to process print data. The universal print driver allows users to manage options and settings for printing devices through the universal print driver. The universal print driver may also be configured with a "best fit" matching function that selects an available printing device to process print data that has characteristics that most closely match user-specified characteristics. The universal print driver generates a graphical user interface that allows users to view printing devices available to process print data and to select options and settings for printing devices.

24 Claims, 10 Drawing Sheets

OTHER PUBLICATIONS

Cohen, Yoram, "SNMP—Simple Network Management Protocol", retrieved from website <http://www2.rad.com/networks/1995/snmp/snmp.htm>, printed on May 18, 2007, 8 pages.

Microsoft, "AsyncUI Notifications", 2005 Microsoft Corporation, retrieved on website <http://www.microsoft.com/whdc/device/print/AsyncUI.mspx>, written May 9, 2006, 11 pages.

U.S. Appl. No. 11/700,692, file date Jan. 30, 2007, Office Action, Mailing date Nov. 29, 2011.

U.S. Appl. No. 11/700,309, file date Jan. 30, 2007, Office Action, Mailing date Nov. 29, 2011.

* cited by examiner

UNIVERSAL PRINT DRIVER WITH BEST FIT DISCOVERY

FIELD OF THE INVENTION

This invention relates generally to print drivers.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Generally speaking, print drivers are processes that process print data generated by an application program and convert the print data into a format supported by a printing device that is intended to process the print data. For example, a user creates an electronic document using a word processing application. The user then selects a print option in the application program to request that the electronic document be printed to a particular printing device. The application program generates and provides print data to a print driver installed on the user's client device. Sometimes this involves the use of an intermediary process referred to as a spooler which saves the print data locally. The print driver processes the print data and generates translated print data that is in a format supported by the particular printing device. For example, the print driver may process the print data and generate translated print data that conforms to the postscript format. The print driver then transmits the translated print data to the particular printing device. The particular printing device processes the translated print data and generates a printed version of the electronic document.

Conventional print drivers are printing device specific. That is, each print driver is designed to translate print data into a format that conforms to a particular format supported by a particular printing device. The device-specific nature of print drivers is the reason for several drawbacks. One issue is that a print driver for each printing device that a user is interested in using must be installed on a user's client device. Print drivers are usually provided on storage media when a printing device is purchased and may also be downloaded over the Internet. When a user travels to a different location the user may not know what printing devices are available to the user or the capabilities of the available printing devices and in many cases does not have the correct driver or access to the Internet to download a correct print driver. Users typically must inquire as to the available printing devices and their capabilities and also must acquire, install and configure the necessary print drivers. These problems can be exacerbated when users are using small portable devices with limited user interfaces because downloading, installing and configuring print drivers can be more difficult with these types of limited devices. Furthermore, users must know how to configure the printing devices once the print drivers are installed. For example, users must generally know the IP address and port of a printing device to configure the print driver. Thus, when users travel to different locations with mobile devices, they often find it difficult to use printing devices at those locations.

SUMMARY

A universal print driver allows an application program to print to any printer available on a network without the user having to perform the configuration that is required in conventional printing arrangements. The universal print driver includes functionality for performing printing device discovery to determine printing devices that are available to process print data. The discovery functionality may include different levels of discovery, depending upon a particular implementation. For example, the discovery functionality may be implemented using a simple discovery mechanism that discovers a subset of available information or using a full discovery mechanism that discovers a full set of available information, such as the identity, physical location, installed options and settings and current status of printing devices. The universal print driver allows users to manage options and settings for printing devices through the universal print driver. For example, the universal print driver may provide a favorite destinations list that allows users to save, view and retrieve information for printing devices. The universal print driver may also be configured with a "best fit" matching function that selects an available printing device to process print data that has characteristics that most closely match user-specified characteristics. The universal print driver generates a graphical user interface that allows users to view printing devices available to process print data and to select options and settings for printing devices.

According to one embodiment of the invention, a computer-implemented method is provided for a print driver to process print data. The computer-implemented method includes the print driver receiving settings data that indicates one or more user-specified settings to be used to process the print data. The print driver generates a graphical user interface that includes a search option. The print driver detects a user selection of the search option. In response to the print driver detecting the user selection of the search option, the print driver discovers, over a network, a set of one or more printing devices that are available to process the print data, wherein the discovering of the set of one or more printing devices includes discovering installed options and current settings of each printing device in the set of one or more printing devices. The print driver selects, from the set of one or more printing devices based upon the settings data, a best fit printing device that is best able to process the print data. The print driver updates the graphical user interface to identify both the set of one or more printing devices and the best fit printing device. The print driver detects user input that indicates a user selection of a particular printing device from the set of one or more printing devices. The print driver processes the print data and generating processed print data that conforms to a format supported by the particular printing device. The print driver also causes the processed print data to be transmitted over a network to the particular printing device.

BRIEF DESCRIPTION OF THE DRAWINGS

In the figures of the accompanying drawings like reference numerals refer to similar elements.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
    II. UNIVERSAL PRINT DRIVER ARCHITECTURE
    III. ACCESSING AND MANAGING PRINTING DEVICES USING THE UNIVERSAL PRINT DRIVER
    IV. PRINTING DEVICE DISCOVERY
    V. "BEST FIT" DISCOVERY
    VI. EXAMPLE OPERATIONAL SCENARIOS
        A. Simple Discovery
        B. Full Discovery
        C. "Best Fit" Discovery
    VII. IMPLEMENTATION MECHANISMS I. Overview A universal print driver allows an application program to print to any printer available on a network without the user having to perform the configuration that is required in conventional printing arrangements. The universal print driver includes functionality for performing printing device discovery to determine printing devices that are available to process print data. The discovery functionality may include different levels of discovery, depending upon a particular implementation. For example, the discovery functionality may be implemented using a simple discovery mechanism that discovers a subset of available information or using a full discovery mechanism that discovers a full set of available information, such as the identity, physical location, installed options and settings and current status of printing devices. The universal print driver allows users to manage options and settings for printing devices through the universal print driver. For example, the universal print driver may provide a favorite destinations list that allows users to save, view and retrieve information for printing devices. The universal print driver may also be configured with a "best fit" matching function that selects an available printing device to process print data that has characteristics that most closely match user-specified characteristics. The universal print driver generates a graphical user interface that allows users to view printing devices available to process print data and to select options and settings for printing devices.

II. Universal Print Driver Architecture

Figure 1:
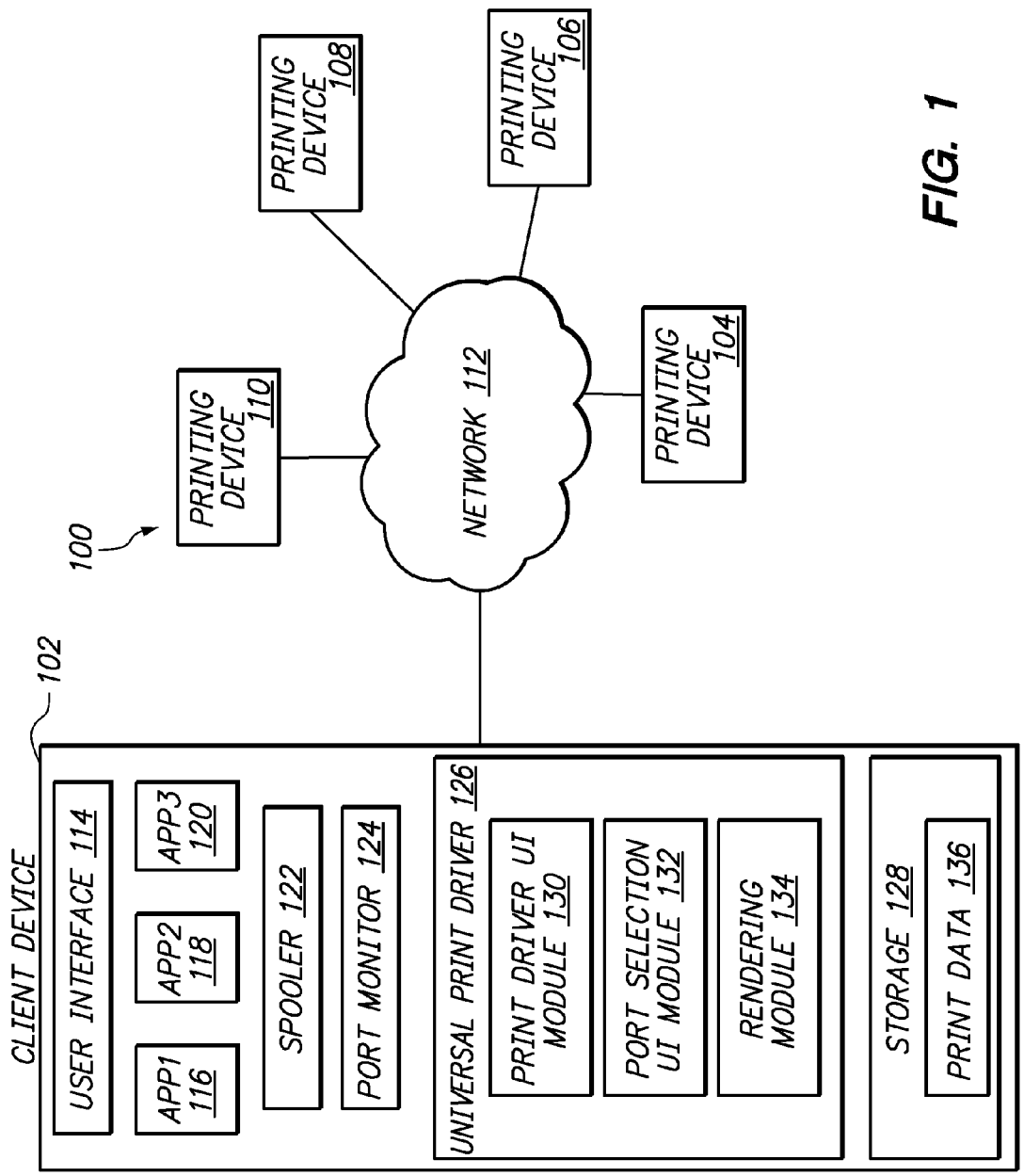
FIG. 1 is a block diagram that depicts an example arrangement 100 in which a universal print driver may be implemented, according to an embodiment of the invention.

FIG. 1 is a block diagram that depicts an example arrangement 100 in which a universal print driver may be implemented, according to an embodiment of the invention. Arrangement 100 includes a client device 102 and printing devices 104, 106, 108, 110 that are communicatively coupled to each other via a network 112. Network 112 may be implemented by any medium or mechanism that provides for the exchange of data between the various elements depicts in FIG. 1. Examples of network 112 include, without limitation, a network such as a Local Area Network (LAN), Wide Area Network (WAN), Ethernet or the Internet, or one or more terrestrial, satellite or wireless links. Network 112 may also provide secure communications between the various elements depicted in FIG. 1. The various elements depicted in FIG. 1 may also communicate with each other via one or more direct communications links that are not depicted in FIG. 1 or described herein for purposes of brevity.

Client device 102 may be any type of client device and the invention is not limited to any particular type of client device. Examples of client device 102 include, without limitation, a desktop computer, a laptop computer, a personal digital assistant (PDA), a mobile device and a telephony device. In the present example, client device 102 includes a user interface 114, applications APP1 116, APP2 118 and APP3 120, a spooler 122, a port monitor 124, a universal print driver 126 and storage 128.

Printing devices 104, 106, 108, 110 may be any type of device that is capable of processing print data and generating a printed version of an electronic document reflected in the print data. Examples of printing devices 104, 106, 108, 110 include, without limitation, printers, network-enabled copy machines and multi-function peripherals (MFPs), and the approaches described herein are not limited to any particular type of printing devices 104, 106, 108, 110. Embodiments of the invention are described herein in the context of four printing devices depicted in FIG. 1, but the approach is applicable to any number of printing devices disposed in the same or different physical locations. Client device 102 may provide print data to printing devices 104, 106, 108, 110 in any format and according to any communications protocol, depending upon a particular implementation. For example, SNMP may be used.

User interface 114 may be implemented by any mechanism(s) and/or process(es) that allow for the exchange of information between client device 102 and users. Examples of user interface 114 include, without limitation, a display, such as a cathode ray tube (CRT) or liquid crystal display (LCD), and an input device, such as a keypad, touchpad, touch screen, keyboard or mouse, or any combination of displays and input devices.

Applications APP1 116, APP2 118 and APP3 120 may be any type of applications that are capable of generating print data. Examples of applications APP1 116, APP2 118 and APP3 120 include, without limitation, a word processing program, a spreadsheet program, an email program or any other type of application.

Universal print driver 126 may be implemented in computer software, computer hardware, or any combination of computer hardware and software. For example, universal print driver 126 may be implemented as one or more software processes executing on client device 102. As another example, universal print driver 126 may be implemented as executable code installed on client 102. According to one embodiment of the invention, universal print driver 126 includes a print driver user interface (UI) module 130, a port selection UI module 132 and a rendering module 134. Universal print driver 126 may include other modules, elements and functionality not depicted in FIG. 1 or described herein for purposes of brevity, and the invention is not limited to universal print driver 126 having any particular combination of modules and functionality. Print driver UI module 130 implements the graphical user interface (GUI) for print drivers on user interface 114. Port selection UI module 132 implements the GUI that is specific to the universal print driver 126 and provides the functionality described hereinafter. Port selection UI module 132 may be implemented in many different ways, depending upon a particular implementation. For example, Port selection UI module 132 may be implemented as an ASynch UI module for the Vista operating system. Rendering module 134 processes print data and generates translated print data that conforms to a format supported by an intended recipient printing device. For example, rendering module 134 may process print data 136 generated by a word processing application, e.g., APP1 116, and generate translated print data that conforms to the postscript format, on the basis that the print data 136 is intended to be processed by printing device 104 and printing device 104 supports postscript. Print driver UI module 130, port selection UI module 132 and rendering module 134 are described in more detail hereinafter.

Storage 128 may be implemented by any type of storage. Examples of storage 128 include, without limitation, volatile memory, such as random access memory (RAM) and non-volatile storage, such as one or more disks or flash memory. Client device 102 may include other mechanisms, modules, processes, etc., depending upon a particular implementation, that are not depicted in FIG. 1 or described herein for purposes of explanation. In FIG. 1, storage 128 is depicted as storing print data 136 for purposes of explanation only, but storage 128 may include various other types of data.

III. Accessing and Managing Printing Devices Using the Universal Print Driver

Figure 2:
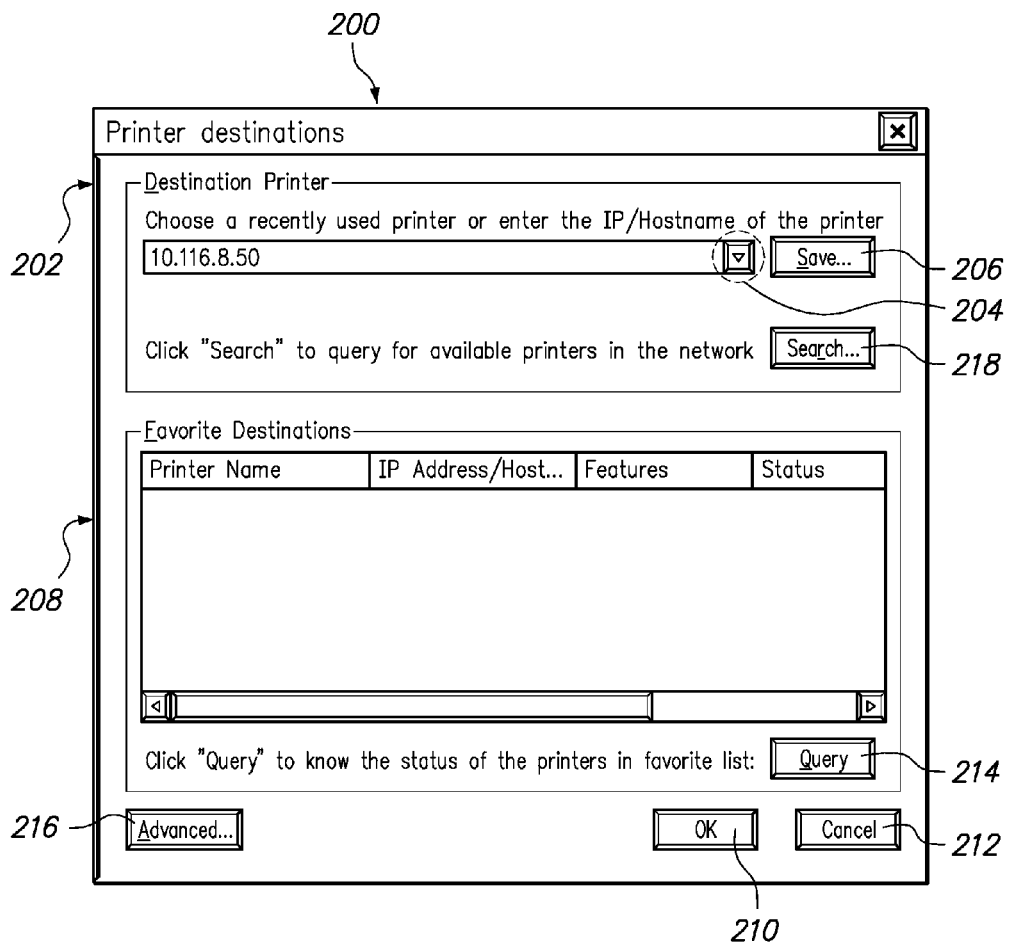
FIG. 2 depicts an example printer destinations screen that is generated by a port selection UI module, according to an embodiment of the invention.

According to one embodiment of the invention, universal print driver 126 is configured to generate a graphical user interface that allows users to access and manage printing devices that are available to process print data. FIG. 2 depicts an example printer destinations screen 200 that is generated by port selection UI module 132. Printer destinations screen 200 is generated in response to a user instantiating or launching universal print driver 126. For example, universal print driver 126 is launched when a user selects to edit printing device properties through an operating system function or when a user selects to edit printer device properties through an application program, e.g, by selecting File→Print→ and then selecting the name of the universal print driver 126. The universal print driver 126 is launched and the port selection UI module 132 causes printer destinations screen 200 to be generated and displayed to the user on user interface 114.

Figure 3:
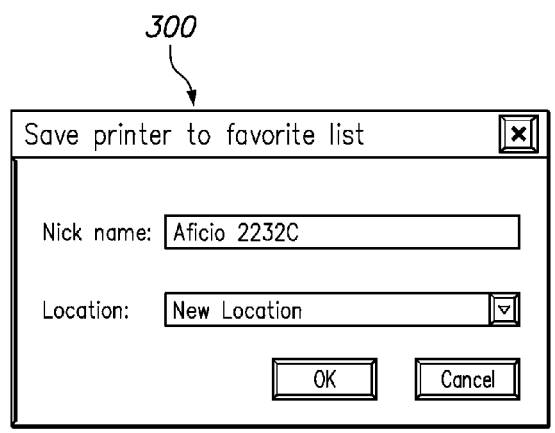
FIG. 3 depicts an example user interface screen that port selection UI module causes to be displayed on user interface in response to a user selecting the save button, according to one embodiment of the invention.

As depicted in FIG. 2, printer destinations screen 200 includes a field 202 that allows a user to manually specify an IP address or name of a printing device if known. A pulldown menu selector 204 allows a user to access recently-entered IP addresses and names. A save button 206 allows a user to save, into a favorite destinations list 208, an IP address or name of a printing device entered into field 202. FIG. 3 depicts an example user interface screen 300 that port selection UI module 132 causes to be displayed on user interface 114 in response to a user selecting the save button 206. User interface screen 300 allows a user to specify a nick name and physical location for a printing device being saved to the favorite destinations list 208. This is particularly convenient in situations where client device 102 is a mobile device and a user needs to print at multiple locations. For example, a user may save printing devices that the user uses at different locations into the favorite destinations list 208. Printing devices listed in the favorite destinations list 208 can be selected by highlighting a particular printing device using a selector mechanism, such as a mouse, followed by a selection of a confirmation button 210. A user can also exit the printer destinations screen 200 by selecting a cancel button 212. The presence of a particular printing device in the favorite destinations list 208 does not necessarily mean that the particular printing device is currently available. For example, since the last time that a user used a particular printing device, the particular printing device may no longer be available because it has been removed from service, is turned off, is not connected to network 112, or is otherwise not currently available or accessible to client device 102. According to one embodiment of the invention, printer destinations screen 200 includes a query button 214 for obtaining the current status of the printing devices listed in the favorite destinations list 208. In response to a user selecting the query button 214, universal print driver 126 queries each of the printing devices included in the favorite destinations list 208. The printing devices return information to universal print driver 126 that indicates the installed features and options and current status and universal print driver 126 updates the favorite destinations list 208 with this information. The availability of the selective query option reduces the amount of computational resources and time required to retrieve information from printing devices since queries may be made on a printing device-by-printing device basis, instead of querying all available printing devices on a network.

Figure 4:
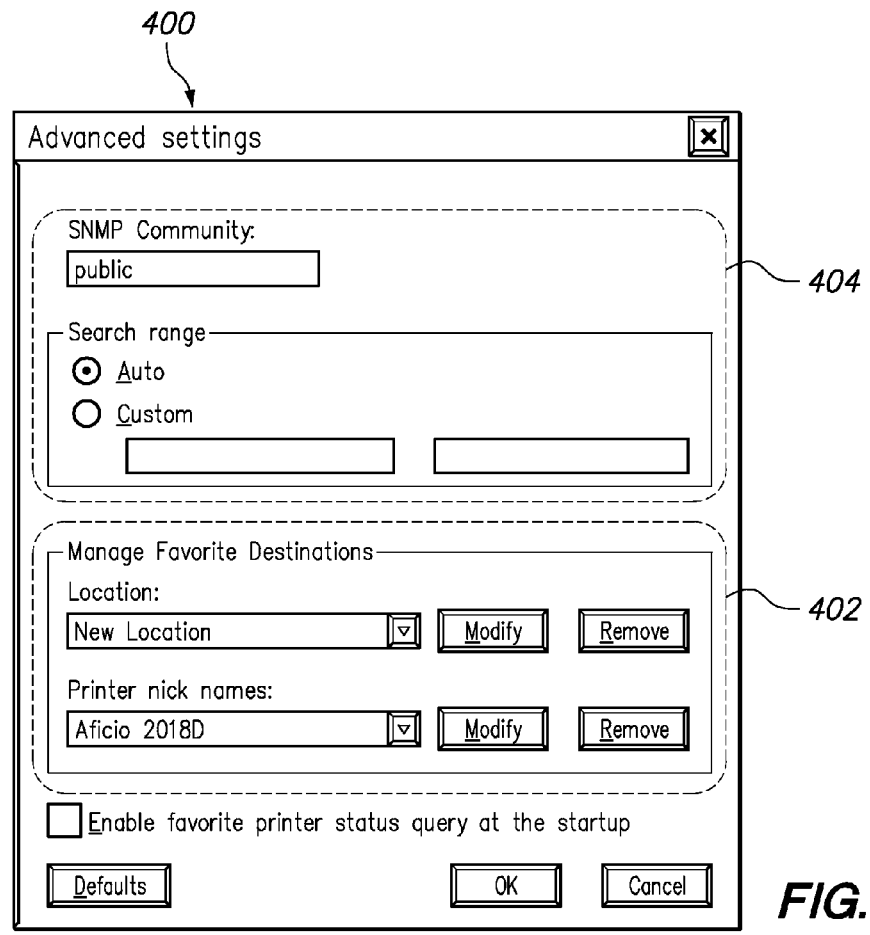
FIG. 4 depicts an advanced settings screen generated by a universal print driver, according to an embodiment of the invention.

Printer destinations screen 200 also includes an advanced button 216, which when selected, allows a user to manage the printing devices maintained in the favorite destinations list 208. In response to detecting a selection of the advanced button 216, universal print driver 126 causes an advanced settings screen 400 to be displayed as depicted in FIG. 4. Advanced settings screen 400 includes a set of user interface controls 402 for managing the printing devices listed in the favorite destinations list 208. The set of user interface controls 402 allow a user to modify or remove printing devices from the favorite destinations list 208. Advanced settings screen 400 also includes a set of user interface controls 404 that allow a user to specify parameters used for the discovery of printing devices. For example, an automatic search may be selected to search for printing devices on the same subnet as client device 102. Alternatively, the user interface controls 204 allow a user to specify a custom search with a particular IP address range. The range allows searches to be restricted to a very limited set of addresses, for example, on the same subnet as the client device 102, or to include a wider range of IP addresses that may include other subnetworks. Advanced settings screen 400 further includes a checkbox 406 which, when selected, causes universal print driver 126 to automatically query the printing devices contained in favorite destinations list 208 when port selection UI module 132 causes the printer destinations screen 200 to be displayed.

IV. Printing Device Discovery

According to one embodiment of the invention, universal print driver 126 is configured to discover printing devices that are available to process print data. Universal print driver 126 may implement any type of discovery mechanism to discover printing devices. For example, universal print driver 126 may be configured to transmit multicast messages over network 112 to discover printing devices 104, 106, 108, 110. As another example, universal print driver 126 may implement a Web Services discovery mechanism to discover printing devices 104, 106, 108, 110. Universal print driver 126 may be configured to perform discovery at specified times, for example on a periodic basis, or in response to a user request, as described in more detail hereinafter.

Universal print driver 126 may be configured to perform different types of discovery. According to one embodiment of the invention, universal print driver 126 is configured to perform simple discovery. Simple discovery generally involves universal print driver 126 discovering a subset of all available information about printing devices that are available to process print data. For example, simple discovery may involve discovering only the identity and physical location of printing devices that are available to process print data and not the installed features and options of those printing devices. Simple discovery may also involve discovering information about a subset of all available printing devices on a network. For example, simple discovery may include performing discovery on a list of specified printing devices.

According to another embodiment of the invention, universal print driver 126 is configured to perform full discovery. Full discovery generally involves universal print driver 126 discovering more information about printing devices that are available to process print data than is discovered using simple discovery. For example, full discovery may include discovering the identity, network address, physical location and installed options and settings of printing devices. Examples of installed options and settings include, without limitation, single or duplex printing, black & white or color printing, installed paper trays and feeders, stapling, punching, folding, cutting and binding capability. Universal print driver 126 may also be configured to discover the current status of printing devices.

Figure 5:
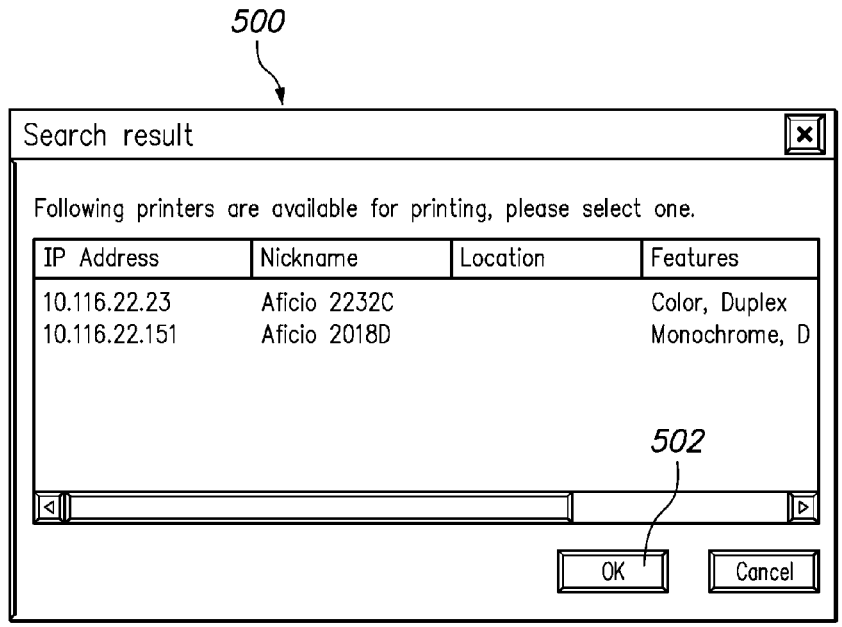
FIG. 5 depicts an example user interface screen that includes the results of universal print driver performing discovery to identify printing devices that are available to process print data.

As depicted in FIG. 2, printer destinations screen 200 includes a search button 218 that allows a user to manually initiate printing device discovery. In response to detecting selection of search button 218, universal print driver 126 discovers printing devices that are accessible to client device 102 and that are available to process print data. As previously mentioned herein, any type of discovery mechanism may be used, depending upon a particular implementation. Universal print driver 126 is also configured to cause information to be generated on user interface 114 to indicate the results of the discovery. FIG. 5 depicts an example search results list 500 that depicts the results of universal print driver 126 performing discovery to identify printing devices that are available to process print data. In this example, search results list 500 indicates several characteristics of the discovered printing devices, namely, the, nickname, IP address, physical location and features of the discovered printing devices. The approach is not limited to any particular characteristics and any type of characteristics may be discovered and/or displayed to a user. Search results list 500 also allows a user to select one of the discovered printing devices to process print data 136.

V. "Best Fit" Discovery

According to one embodiment of the invention, universal print driver 126 is configured to perform "best fit" discovery of available printing devices. Best fit discovery generally involves determining a particular printing device, from a set of available printing devices, that best satisfies a set of printing device criteria. The printing device criteria may include a wide variety of criteria. For example, a user may specify desired values for options and settings, such as single or duplex printing, black & white or color printing, installed paper trays and feeders, stapling, punching, folding, cutting and binding capability. As previously mentioned herein, the user may also specify search parameter values via user interface controls 404. The printing device criteria may be obtained from a user via a graphical user interface or from other sources. Universal print driver 126 performs discovery to identify available printing devices. Universal print driver 126 then determines which of the available printing devices best satisfies the printing device criteria. Universal print driver 126 may automatically select the best printing device and send print data to the selected printing device. Alternatively, universal print driver 126 may present the available printing devices to a user and identify the particular printing device that universal print driver 126 that has been selected as the "best fit" printing device. Additional details of the "best fit" discovery approach are described in more detail hereinafter.

VI. Example Operational Scenarios

A. Simple Discovery

Simple discovery generally involves universal print driver 126 discovering a subset of all available information about printing devices that are available to process print data. This approach is a "lightweight" approach that consumes relatively fewer computational resources and time compared to the full discovery approach described hereinafter.

Figure 6:
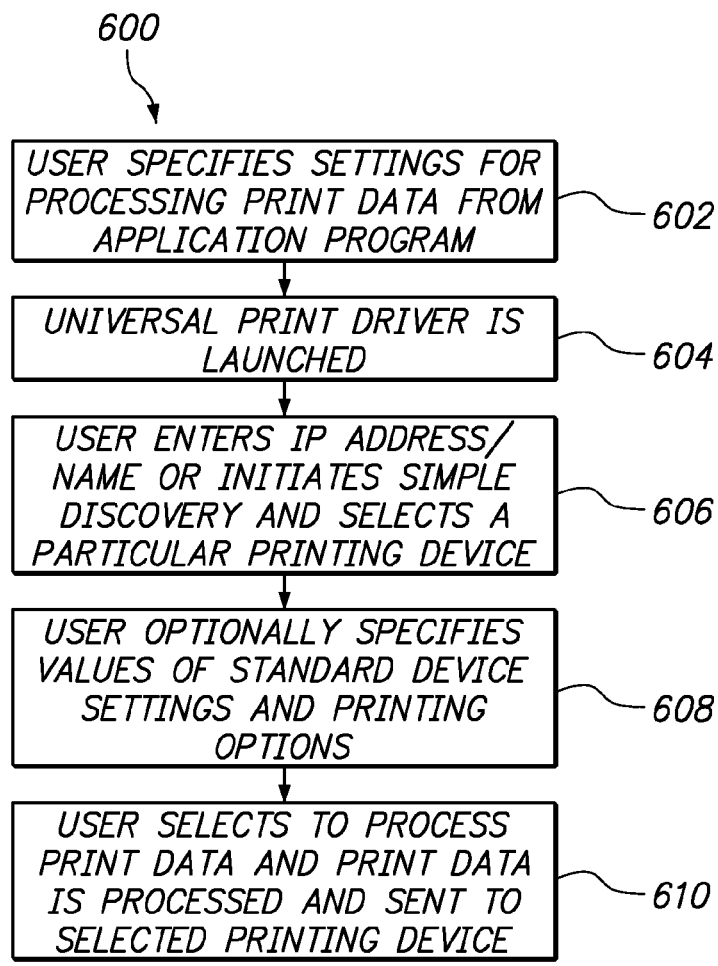
FIG. 6 is a flow diagram that depicts an approach for universal print driver performing simple discovery according to one embodiment of the invention.

FIG. 6 is a flow diagram 600 that depicts an approach for universal print driver 126 performing simple discovery according to one embodiment of the invention. In step 602, a user specifies settings for processing print data from an application program. For example, suppose that APP1 116 is a word processing program and a user of client device 102 has generated an electronic document that the user wishes to print. The user selects a print option within APP1 116 and print driver UI module 130 causes a printing graphical user interface screen to be displayed. The user interacts with the printing graphical user interface screen and selects the values for one or more print settings. For example, the user might specify that the electronic document is to be printed with duplex, i.e., double sided, printing, punched with holes and stapled. The settings values selected by the user are stored as settings data, for example, on storage 128.

In step 604, the universal print driver 126 is launched. For example, universal print driver 126 is launched when a user selects to edit printing device properties through an operating system function or when a user selects to edit printer device properties through application program APP1 116, e.g, by selecting File→Print→ and then selecting the name of the universal print driver 126. The universal print driver 126 is launched and the port selection UI module 132 causes printer destinations screen 200 to be generated and displayed to the user on user interface 114.

In step 606, a particular printing device is identified for processing print data 136. According to the simple discovery option, the particular printing device may be identified in one of two ways. First, a user can enter into field 202 an IP address or hostname of a particular printing device and then select confirmation button 210. Alternatively, the user can select the search button 218 to cause the universal print driver 126 to perform simple discovery. With simple discovery, the universal print driver 126 determines the printing devices that are available to process print data and displays them in the search results list 500 depicted in FIG. 5. This may include the use of a discovery mechanism to identify the printing devices that are connected to network 112 and available to process print data. Unlike with full discovery however, simple discovery involves acquiring less information from printing devices. For example, simple discovery may involve universal print driver 126 querying printing devices for only name and physical location and no other information, such as the installed features and options. According to one embodiment of the invention, universal print driver 126 is configured to perform simple discovery on only a set of printing devices that were previously installed, configured other otherwise maintained. The results of the simple discovery are displayed in search results list 500. The user then selects a particular printing device from search results list 500 and selects the confirmation button 502. The user then selects the confirmation button 210 to leave the printer destinations screen 200 and return to the print screen associated with application program APP1 116.

Once a particular printing device has been specified, either via a user entering an IP address or hostname, or by the user selecting the particular printing device after simple discovery, then in step 608, the user may optionally specify values of standard device settings and printing options to be used with the particular printing device. The standard device settings and printing options are the same for all printing devices discovered using simple discovery and are not specific to any particular printing device. Thus, it is not known which of the standard device settings and printing options are supported by the particular printing device.

In step 610, the user selects to process the print data and the print data is processed and sent to the particular printing device. For example, the user selects a confirmation button from the printing graphical user interface screen generated by application program APP1 116. In response to detecting the selection of the confirmation button, the rendering module 134 processes the print data 136 and generates processed print data that conforms to a format supported by the particular printing device. The port monitor 124 causes the processed print data to be transmitted to the particular printing device. In situations where values of the standard device settings and printing options are not supported by the particular printing device, then those values may be ignored. For example, suppose that the user selected duplex printing from the standard device settings but the particular printing device does not support duplex printing. In this situation the particular printing device processes the processed print data using single sided printing.

Figure 7:
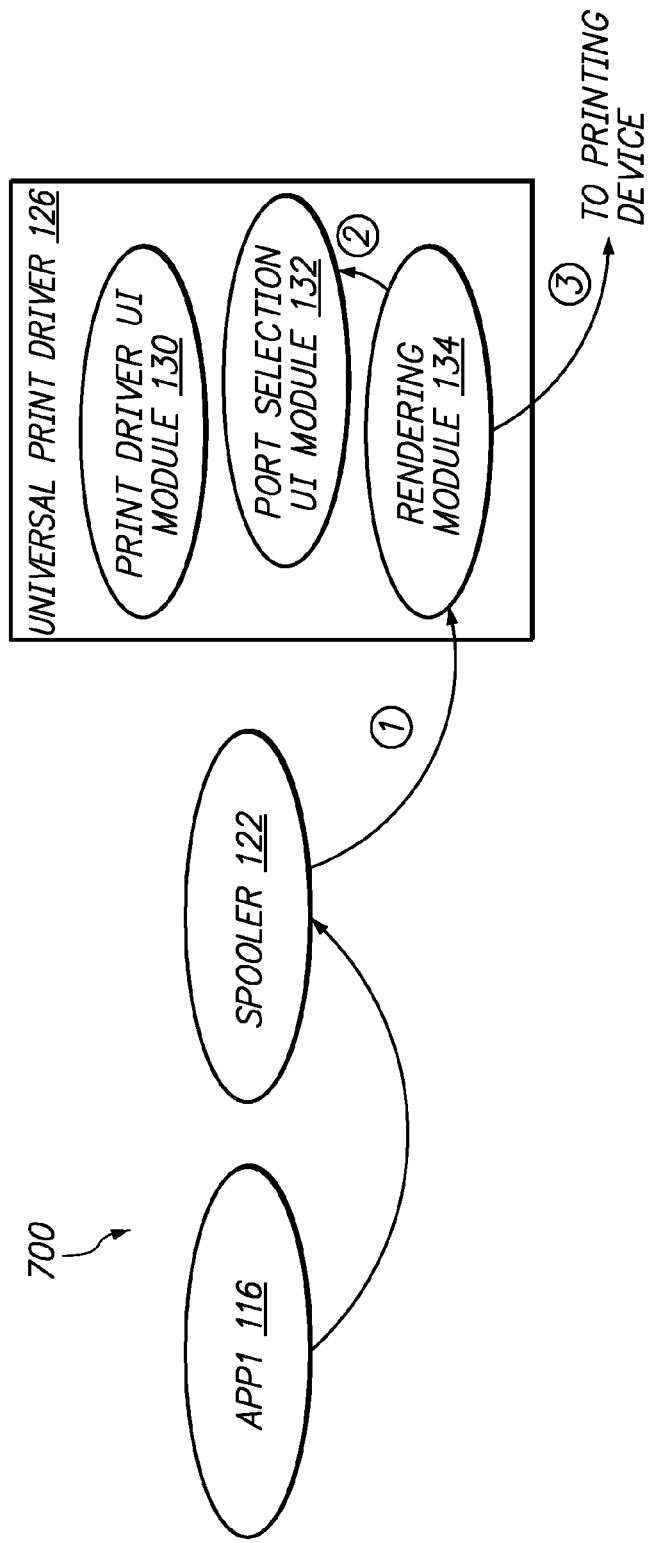
FIG. 7 is a block diagram that depicts the execution of different components during simple discovery.

FIG. 7 is a block diagram 700 that depicts the execution of different components during simple discovery. As depicted in FIG. 7, an application (in this example APP1 116) provides print data to spooler 122. Spooler 122 provides the print data to rendering module 134 to generate translated print data that conforms to a format supported by the particular printing device that is to generate a printed version of an electronic document reflected in the print data. Before the translated print data can be generated, however, port selection UI module 132 determines the particular printing device to be used to process the print data. This is done either by a user specifying the name or IP address of the particular print device, or by the user selecting the particular printing device after simple discovery. The rendering module 134 then generates the translated print data and provides the translated print data to the particular printing device.

B. Full Discovery

Full discovery generally involves universal print driver 126 discovering more available information about printing devices than is obtained with the simple discovery approach. This approach requires relatively more computational resources and time than the simple discovery approach, but provides more information to users about the available printing devices.

Figure 8:
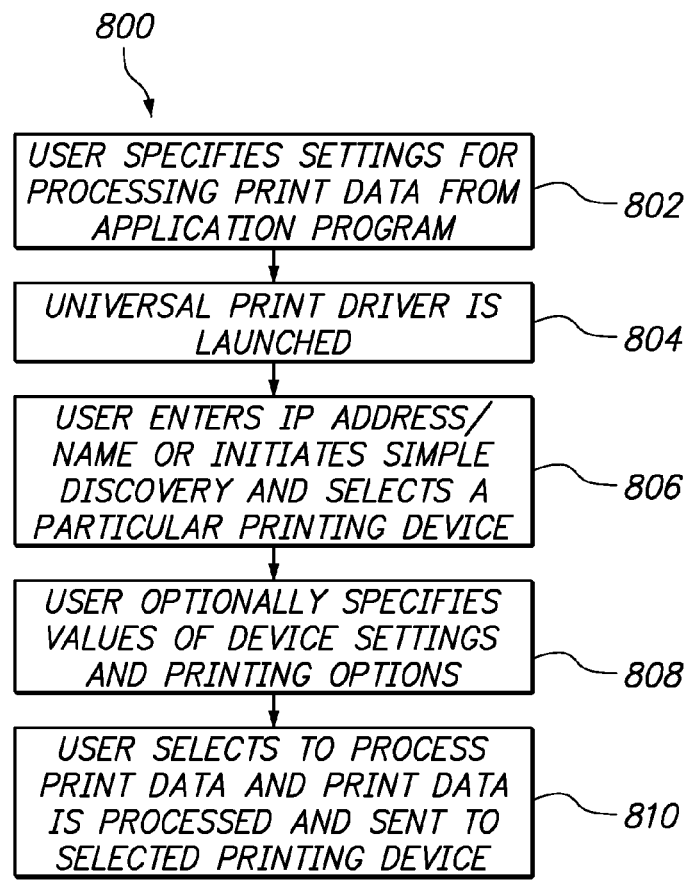
FIG. 8 is a flow diagram that depicts an approach for universal print driver performing full discovery according to one embodiment of the invention.

FIG. 8 is a flow diagram 800 that depicts an approach for universal print driver 126 performing full discovery according to one embodiment of the invention. In step 802, a user specifies settings for processing print data from an application program. For example, suppose that APP1 116 is a word processing program and a user of client device 102 has generated an electronic document that the user wishes to print. The user selects a print option within APP1 116 and print driver UI module 130 causes a printing graphical user interface screen to be displayed. The user interacts with the printing graphical user interface screen and selects the values for one or more print settings. For example, the user might specify that the electronic document is to be printed with duplex, i.e., double sided, printing, punched with holes and stapled. The settings values selected by the user are stored as settings data, for example, on storage 128.

In step 804, the universal print driver 126 is launched. For example, universal print driver 126 is launched when a user selects to edit printing device properties through an operating system function or when a user selects to edit printer device properties through application program APP1 116, e.g, by selecting File→Print→ and then selecting the name of the universal print driver 126. The universal print driver 126 is launched and the port selection UI module 132 causes printer destinations screen 200 to be generated and displayed to the user on user interface 114.

In step 806, a particular printing device is identified for processing print data 136. According to the simple discovery option, the particular printing device may be identified in one of two ways. First, a user can enter into field 202 an IP address or hostname of a particular printing device and then select confirmation button 210. Alternatively, the user can select the search button 218 to cause the universal print driver 126 to perform full discovery. With full discovery, the universal print driver 126 determines the printing devices that are available to process print data and displays them in the search results list 500 depicted in FIG. 5. This may include the use of a discovery mechanism to identify the printing devices that are connected to network 112 and available to process print data. Unlike with simple discovery however, full discovery involves acquiring more information from printing devices. For example, full discovery may involve universal print driver 126 querying printing devices for identity, network address, physical location and installed options and settings. The results of the full discovery are displayed in search results list 500. The user then selects a particular printing device from search results list 500 and selects the confirmation button 502. The user then selects the confirmation button 210 to leave the printer destinations screen 200 and return to the print screen associated with application program APP1 116.

Once a particular printing device has been specified, either via a user entering an IP address or hostname, or by the user selecting the particular printing device after full discovery, then in step 808, the user may optionally specify values of device settings and printing options to be used with the particular printing device.

In step 810, the user selects to process the print data and the print data is processed and sent to the particular printing device. For example, the user selects a confirmation button from the printing graphical user interface screen generated by application program APP1 116. In response to detecting the selection of the confirmation button, the rendering module 134 processes the print data 136 and generates processed print data that conforms to a format supported by the particular printing device. The port monitor 124 causes the processed print data to be transmitted to the particular printing device.

Figure 9:
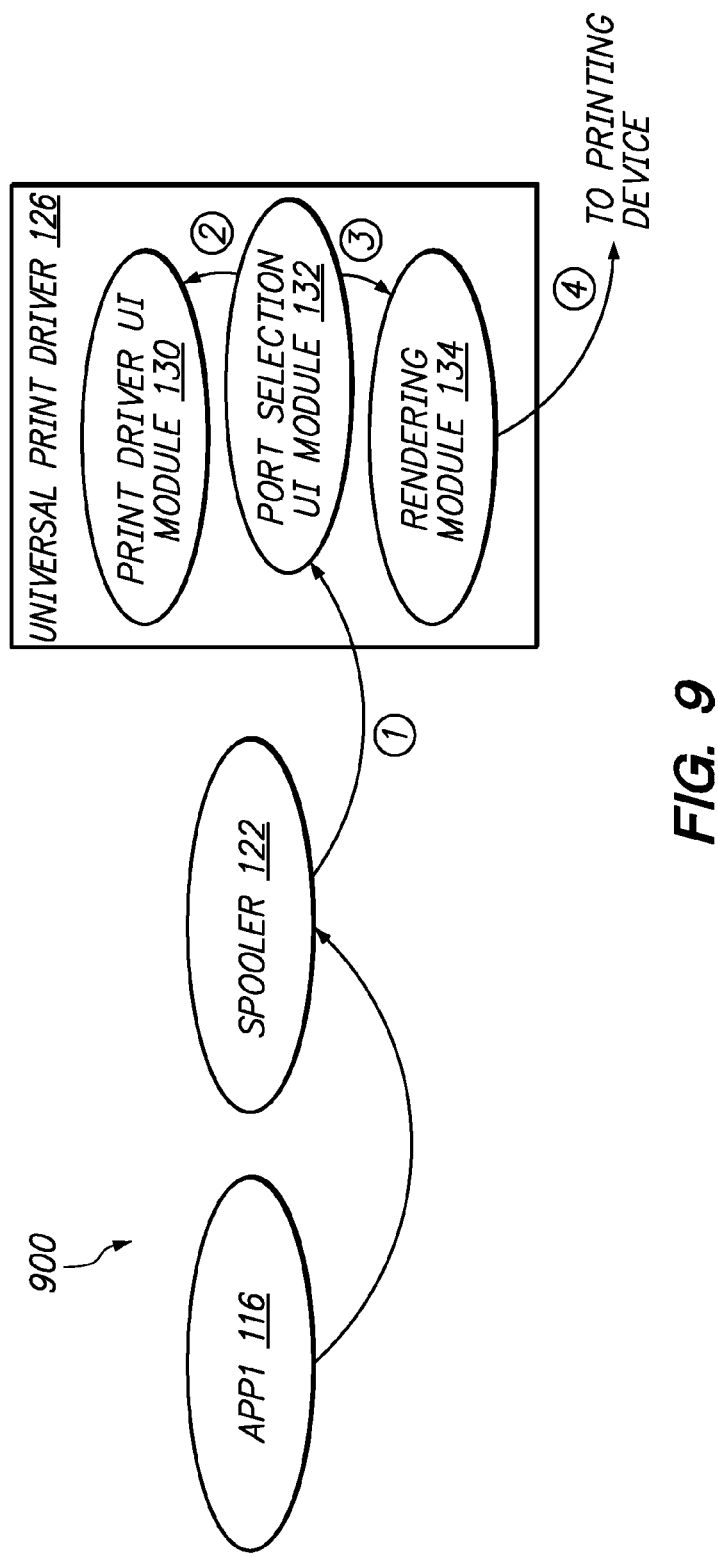
FIG. 9 is a block diagram that depicts the execution of different components during simple discovery.

FIG. 9 is a block diagram 900 that depicts the execution of different components during full discovery. As depicted in FIG. 9, an application (in this example APP1 116) provides print data to spooler 122. Spooler 122 invokes port selection UI module 132 which in turn invokes print driver UI module 130 to obtain information about the particular printing device to be used, for example printing options settings to be used to process the print data. Port selection UI module 132 then determines the particular printing device to be used to process the print data. This is done either by a user specifying the name or IP address of the particular print device, or by the user selecting the particular printing device after simple discovery. Rendering module 134 then generates translated print data that conforms to a format supported by the particular printing device that is to generate a printed version of an electronic document reflected in the print data. The rendering module 134 then generates the translated print data and provides the translated print data to the particular printing device.

C. "Best Fit" Discovery

Figure 10:
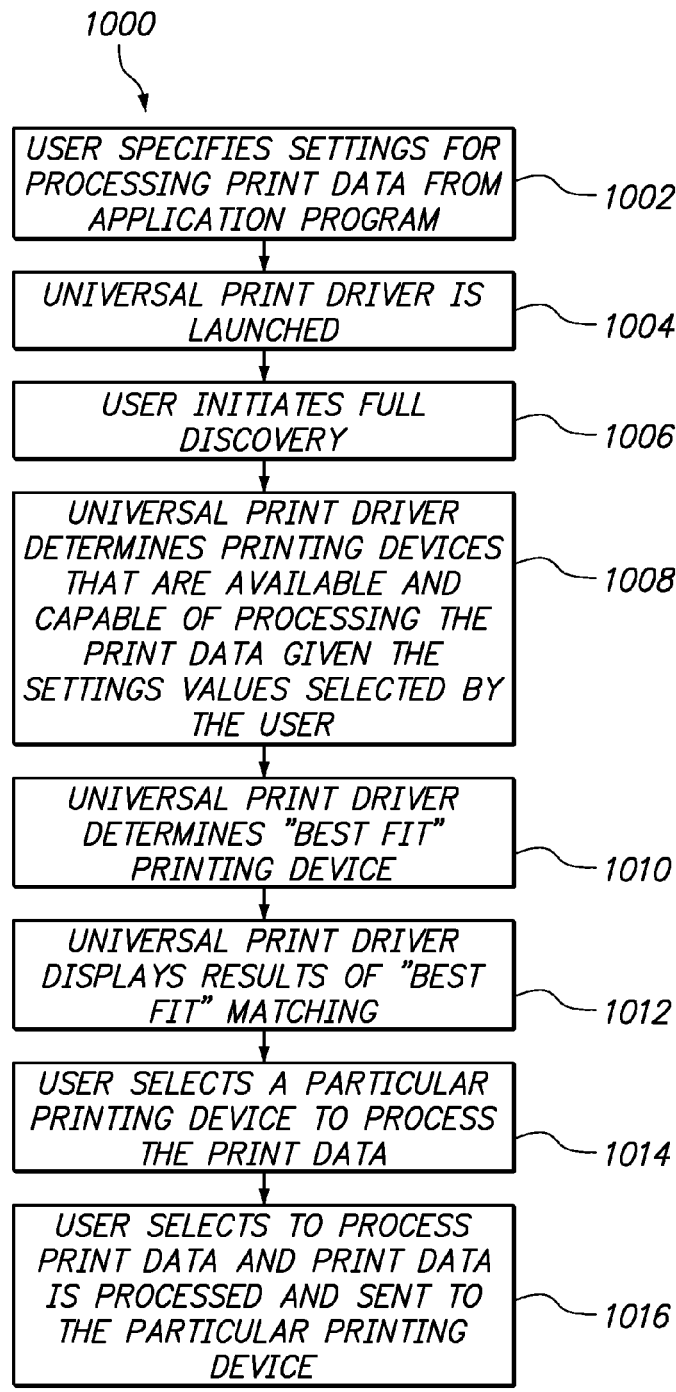
FIG. 10 is a flow diagram that depicts the "best fit" matching option according to one embodiment of the invention.

FIG. 10 is a flow diagram 1000 that depicts the "best fit" matching option according to one embodiment of the invention. In step 1002, a user specifies settings for processing print data from an application program. For example, suppose that APP1 116 is a word processing program and a user of client device 102 has generated an electronic document that the user wishes to print. The user selects a print option within APP1 116 and print driver UI module 130 causes a printing graphical user interface screen to be displayed. The user interacts with the printing graphical user interface screen and selects the values for one or more print settings. For example, the user might specify that the electronic document is to be printed with duplex, i.e., double sided, printing, punched with holes and stapled. The settings values selected by the user are stored as settings data, for example, on storage 128.

In step 1004, the universal print driver 126 is launched. For example, universal print driver 126 is launched when a user selects to edit printing device properties through an operating system function or when a user selects to edit printer device properties through application program APP1 116, e.g, by selecting File→Print→ and then selecting the name of the universal print driver 126. The universal print driver 126 is launched and the port selection UI module 132 causes printer destinations screen 200 to be generated and displayed to the user on user interface 114.

In step 1006, the user initiates full discovery of printing devices that are available to print the electronic document. For example, the user selects the search button 218 from printer destinations screen 200.

In step 1008, in response to detecting the selection of the search button 218, the universal print driver 126 performs automatic discovery and determines one or more printing devices that are available and capable to process print data 136 given the settings values selected by the user and reflected in the settings data. As previously mentioned herein, universal print driver 126 may use any type of discovery mechanism or approach to discover the printing devices that are available to process print data 136.

In step 1010, the universal print driver 126 determines the "best fit" printing device. The "best fit" printing device is the printing device among the available printing devices that is best able to print the electronic document based upon print data 136 and print settings values specified by the user and reflected in the settings data. The determination of which of the available printing devices constitutes the "best fit" printing device may be made using a wide variety of techniques, depending upon a particular implementation. For example, the "best fit" printing device may be the particular printing device that supports the largest number of options and features specified by the user and reflected in the settings data. As another example, the settings values specified by the user and reflected in the settings data may be weighted and the weightings used to determine the printing device that best satisfies the settings data. This may include determining a score for each available printing device that was discovered, where a score reflects how well the corresponding printing device supports the options and settings specified in the settings data.

In step 1012, universal print driver 126 causes the results of the "best fit" matching to be displayed to the user. For example, universal print driver 126 may cause the one or more printing devices to be displayed in a list similar to search results list 500. The printing devices in the list may be ordered based upon their relative capabilities to process print data 136. For example, the list may be ordered so that the "best fit" printing device appears at the top of the list with the other printing devices listed in descending order based upon their relative capabilities to process the print data 136 based upon the settings values selected by the user. The "best fit" printing device may also be conspicuously marked or identified as the "best fit" printing device using any type of graphical user interface features. For example, color, shading, highlighting, styling, marking or any other type of feature or graphical user interface object attribute may be selected to identify the "best fit" printing device. The graphical user interface may also indicate the relative capabilities of the printing devices to process the printing data. For example, the printing devices that satisfy at least a high threshold level of support of the options and settings specified in the settings data may be displayed with the color green as an attribute. The printing devices that do not satisfy the high threshold but do satisfy a medium threshold level of support may be displayed with the color yellow as an attribute. The printing devices that do not satisfy at least a lowest threshold level of support may be displayed with the color red as an attribute. Certain settings, as indicated by the settings data, may be designated by a user as required. In this situation, a particular printing device that does not support a required setting may be automatically categorized in the lowest category of printing devices, for example, displayed in the color red. This approach allows a user to easily discern which printing devices are best able to satisfy the settings values selected by the user and may be very convenient in various situations. For example, the user may easily recognize that the best two printing devices will work equally well to process print data. One of the two printing devices, however, may have a closer physical location with respect to the user, so the user may select that printing device. As another example, suppose that a user specifies that an electronic document is to be printed in duplex color and stapled. Suppose further that none of the available printing devices are currently able to provide all three of these services, i.e., duplex printing in color with stapling, but one available printing device provides duplex color printing, but no stapling (either because the printing device is not configured with a stapling option or because the stapling option is not currently available because of an error or a lack of staples), while another printing device provides duplex printing and stapling, but no color printing. In this situation, the graphical user interface generated by the universal print driver 126 visually indicates the particular features that are supported by each printing device and indicates one of the two printing devices as the "best fit" printing device, based upon which options have a higher priority. For example, if the color printing is considered to be more important than the stapling, then the first printing device is designated as the "best fit" printing device. The user may select either printing device, depending upon the features and characteristics that are most important to the user.

As yet another example, the visual attributes of the features displayed in the list of printing devices may reflect the compatibility of those features with the settings value selected by the user. For example, suppose that a user selected color printing and a particular printing device supports only black & white printing. The black & white feature for the particular printing device may be displayed in a different color to draw the user's attention to the fact that the particular printing device does not support color printing.

In step 1014, the user selects a particular printing device from the list of available printing devices generated by the universal print driver 126. For example, a user may use a selection device, such as a mouse, to select the particular printing device from the search results list 500 and then select the confirmation button 502. Once the selection is made, universal print driver 126 causes data that identifies the particular printing device to be stored to make it available for other modules. For example, universal print driver 126 may cause the port information of the particular printing device to be stored, e.g., on storage 128, so that it is available to port monitor 124. The universal print driver 126 also causes the printer destinations screen to be undisplayed and print driver UI module 130 causes the printing graphical user interface screen to be displayed on user interface 114.

In step 1016, the user selects to process the print data and the print data is processed and sent to the particular printing device. This may include the rendering module 134 processing the print data 136 and generating processed print data that is transmitted to the particular printing device. For example, the user selects the confirmation button 502 from the search results list 500. In response to detecting the selection of the confirmation button 502, the rendering module 134 processes the print data 136 and generates processed print data. The port monitor 124 causes the processed print data to be transmitted to the particular printing device.

Figure 11:
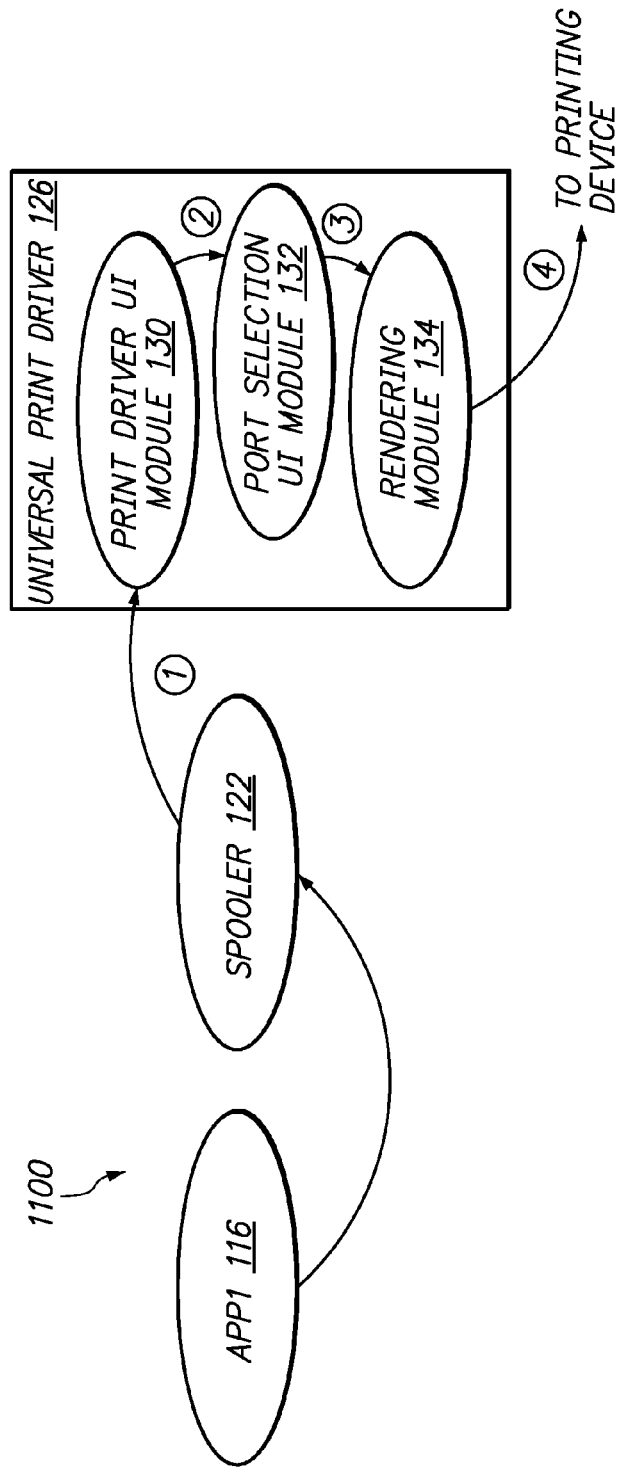
FIG. 11 is a block diagram that depicts the execution of different components during "best fit" discovery.

FIG. 11 is a block diagram 1100 that depicts the execution of different components during "best fit" discovery. As depicted in FIG. 11, an application (in this example APP1 116) provides print data to spooler 122. Spooler 122 invokes print driver UI module 130 to obtain information about the particular printing device to be used, for example printing options settings to be used to process the print data. Port selection UI module 132 is then invoked to determine the particular printing device to be used to process the print data. This is done by a user specifying the name or IP address of the particular print device, universal print driver 126 automatically selecting the "best fit" printing device, or by universal print driver 126 presenting the list of available printing devices, along with the "best fit" printing device, and the user selecting the particular printing device. Rendering module 134 then generates translated print data that conforms to a format supported by the particular printing device that is to generate a printed version of an electronic document reflected in the print data. The rendering module 134 then generates the translated print data and provides the translated print data to the particular printing device.

VII. Implementation Mechanisms

Figure 12:
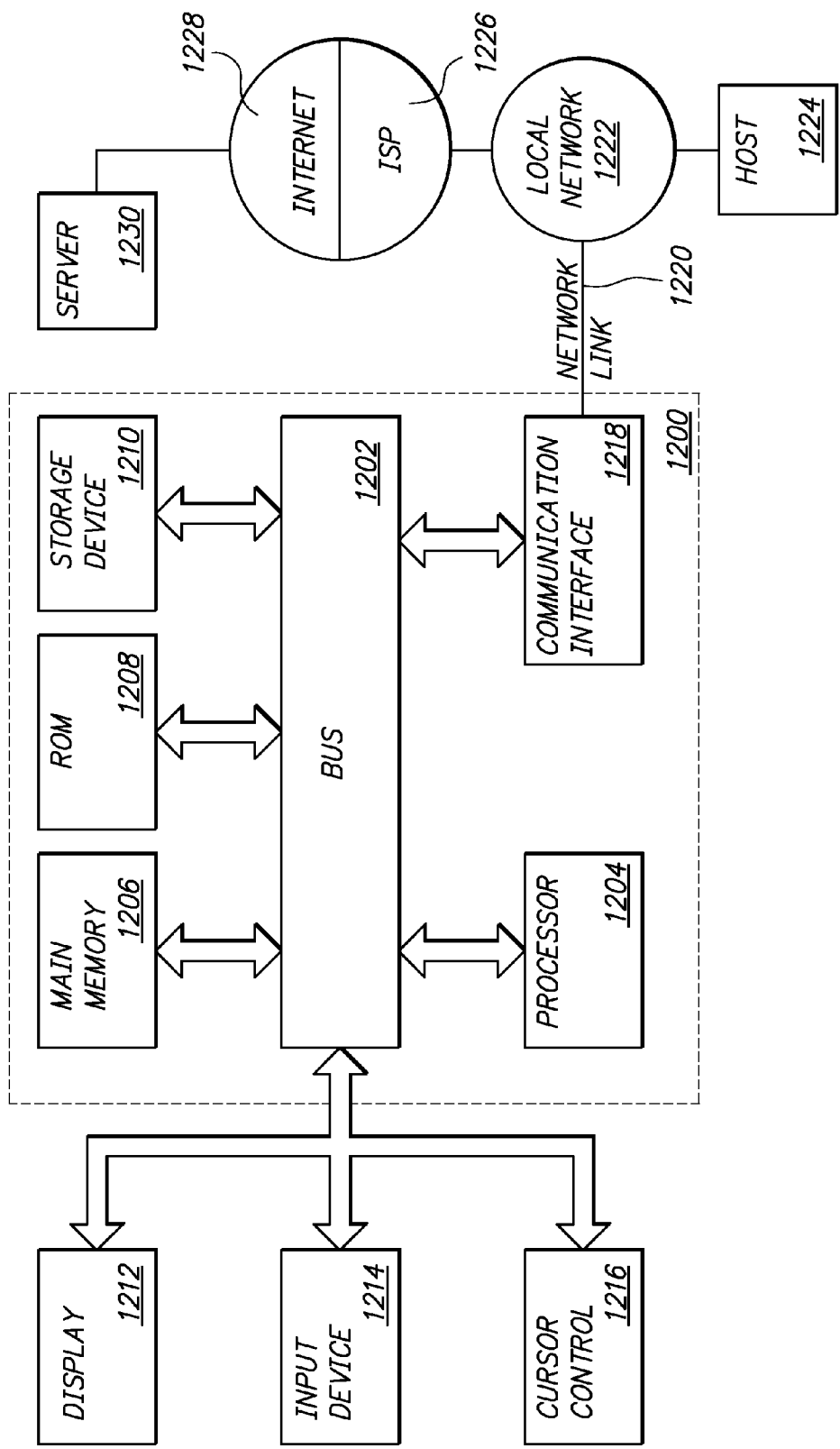
FIG. 12 is a block diagram of a computer system on which embodiments of the invention may be implemented.

FIG. 12 is a block diagram that illustrates an example computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for implementing the techniques described herein. According to one embodiment of the invention, those techniques are performed by computer system 1200 in response to processor 1204 executing one or more sequences of one or more instructions contained in main memory 1206. Such instructions may be read into main memory 1206 from another machine-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1200, various machine-readable media are involved, for example, in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are exemplary forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. The received code may be executed by processor 1204 as it is received, and/or stored in storage device 1210, or other non-volatile storage for later execution. In this manner, computer system 1200 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for a print driver to process print data, the computer-implemented method comprising:

the print driver receiving settings data that indicates one or more user-specified settings to be used to process the print data;

the print driver generating a graphical user interface that includes a search option;

the print driver detecting a user selection of the search option;

in response to the print driver detecting the user selection of the search option, the print driver discovering, over a network, a set of one or more printing devices that are available to process the print data, wherein the discovering of the set of one or more printing devices includes discovering installed options and current settings of each printing device in the set of one or more printing devices;

the print driver selecting, from the set of one or more printing devices, a best fit printing device that is best able to process the print data, wherein the selecting is performed based upon the settings data that indicates the one or more user-specified settings to be used to process the print data and a weighting for each of the one or more user-specified settings to be used to process the print data and wherein the selecting includes determining a score for each printing device from the set of one or more printing devices, wherein each score is determined based upon the weighting for each of the one or more user-specified settings indicated by the settings data and wherein each score indicates whether the one or more user-specified settings indicated by the settings data is supported by each printing device from the set of one or more printing devices;

the print driver updating the graphical user interface to identify both the set of one or more printing devices and the best fit printing device;

the print driver detecting user input that indicates a user selection of a particular printing device from the set of one or more printing devices;

in response to detecting the user selection of the particular printing device from the set of one or more printing devices, the print driver processing the print data and generating processed print data that conforms to a format supported by the particular printing device; and the print driver causing the processed print data to be transmitted over a network to the particular printing device.

2. The computer-implemented method as recited in claim 1, further comprising the print driver querying each printing device in the set of one or more printing devices to determine a current configuration of each printing device.

3. The computer-implemented method as recited in claim 2, wherein the print driver selecting, from the set of one or more printing devices based upon the settings data, a best fit printing device that is best able to process the print data includes the print driver selecting the best fit printing device based upon both the current configuration of each printing device from the set of one or more printing devices and the settings data.

4. The computer-implemented method as recited in claim 3, wherein the print driver selecting the best fit printing device based upon both the current configuration of each printing device from the set of one or more printing devices and the settings data includes determining whether the one or more user-specified settings indicated by the settings data are supported by each printing device from the set of one or more printing devices.

5. The computer-implemented method as recited in claim 1, wherein the print driver updating the graphical user interface to identify both the set of one or more printing devices and the best fit printing device includes selecting display attributes of the graphical user interface so that the best fit printing device is visually distinguished from other printing devices in the set of one or more printing devices.

6. The computer-implemented method as recited in claim 1, wherein the graphical user interface allows the user to specify that the particular printing device is to be saved to a favorites list.

7. The computer-implemented method as recited in claim 6, wherein:
the graphical user interface further allows the user to select a printing device from the list of favorites and request a current status for the selected printing device;
in response to detecting the user request for the current status for the selected printing device, the universal print driver querying the selected printing device for current status and updating the graphical user interface to reflect the current status of the selected printing device.

8. The computer-implemented method as recited in claim 1, wherein:
the graphical user interface allows the user to enter data that identifies the particular printing device and allows the particular printing device to be used without the user having to select the search option.

9. A non-transitory computer-readable medium storing instructions which, when processed by one or more processors cause:
a print driver receiving settings data that indicates one or more user-specified settings to be used to process the print data;
the print driver generating a graphical user interface that includes a search option;
the print driver detecting a user selection of the search option;
in response to the print driver detecting the user selection of the search option, the print driver discovering, over a network, a set of one or more printing devices that are available to process the print data, wherein the discovering of the set of one or more printing devices includes discovering installed options and current settings of each printing device in the set of one or more printing devices;
the print driver selecting, from the set of one or more printing devices, a best fit printing device that is best able to process the print data, wherein the selecting is performed based upon the settings data that indicates the one or more user-specified settings to be used to process the print data and a weighting for each of the one or more user-specified settings to be used to process the print data and wherein the selecting includes determining a score for each printing device from the set of one or more printing devices, wherein each score is determined based upon the weighting for each of the one or more user-specified settings indicated by the settings data and wherein each score indicates whether the one or more user-specified settings indicated by the settings data is supported by each printing device from the set of one or more printing devices;
the print driver updating the graphical user interface to identify both the set of one or more printing devices and the best fit printing device;
the print driver detecting user input that indicates a user selection of a particular printing device from the set of one or more printing devices;
in response to detecting the user selection of the particular printing device from the set of one or more printing devices, the print driver processing the print data and generating processed print data that conforms to a format supported by the particular printing device; and
the print driver causing the processed print data to be transmitted over a network to the particular printing device.

10. The non-transitory computer-readable medium as recited in claim 9,
further comprising additional instructions which, when processed by the one or more processors, causes the print driver querying each printing device in the set of one or more printing devices to determine the current configuration of each printing device.

11. The non-transitory computer-readable medium as recited in claim 10, wherein the print driver selecting, from the set of one or more printing devices based upon the settings data, a best fit printing device that is best able to process the print data includes the print driver selecting the best fit printing device based upon both the current configuration of each printing device from the set of one or more printing devices and the settings data.

12. The non-transitory computer-readable medium as recited in claim 11, wherein the print driver selecting the best fit printing device based upon both the current configuration of each printing device from the set of one or more printing devices and the settings data includes determining whether the one or more user-specified settings indicated by the settings data are supported by each printing device from the set of one or more printing devices.

13. The non-transitory computer-readable medium as recited in claim 9, wherein the print driver updating the graphical user interface to identify both the set of one or more printing devices and the best fit printing device includes selecting display attributes of the graphical user interface so that the best fit printing device is visually distinguished from other printing devices in the set of one or more printing devices.

14. The non-transitory computer-readable medium as recited in claim 9, wherein the graphical user interface allows the user to specify that the particular printing device is to be saved to a favorites list.

15. The non-transitory computer-readable medium as recited in claim 14, wherein:
the graphical user interface further allows the user to select a printing device from the list of favorites and request a current status for the selected printing device;
in response to detecting the user request for the current status for the selected printing device, the universal print driver querying the selected printing device for current status and updating the graphical user interface to reflect the current status of the selected printing device.

16. The non-transitory computer-readable medium as recited in claim 9, wherein:
the graphical user interface allows the user to enter data that identifies the particular printing device and allows the particular printing device to be used without the user having to select the search option.

17. An apparatus comprising a print driver, wherein the print driver comprises:
a rendering module configured to process print data generated by an application program and generate translated print data that conforms to a format supported by a printing device that is intended to process the translated print data; and one or more other modules configured to cause:
- the print driver receiving settings data that indicates one or more user-specified settings to be used to process the print data;
- the print driver generating a graphical user interface that includes a search option;
- the print driver detecting a user selection of the search option;
- in response to the print driver detecting the user selection of the search option, the print driver discovering, over a network, a set of one or more printing devices that are available to process the print data, wherein the discovering of the set of one or more printing devices includes discovering installed options and current settings of each printing device in the set of one or more printing devices;
- the print driver selecting, from the set of one or more printing devices, a best fit printing device that is best able to process the print data, wherein the selecting is performed based upon the settings data that indicates the one or more user-specified settings to be used to process the print data and a weighting for each of the one or more user-specified settings to be used to process the print data and wherein the selecting includes determining a score for each printing device from the set of one or more printing devices, wherein each score is determined based upon the weighting for each of the one or more user-specified settings indicated by the settings data and wherein each score indicates whether the one or more user-specified settings indicated by the settings data is supported by each printing device from the set of one or more printing devices;
- the print driver updating the graphical user interface to identify both the set of one or more printing devices and the best fit printing device;
- the print driver detecting user input that indicates a user selection of a particular printing device from the set of one or more printing devices;
- in response to detecting the user selection of the particular printing device from the set of one or more printing devices, the print driver processing the print data and generating processed print data that conforms to a format supported by the particular printing device; and
- the print driver causing the processed print data to be transmitted over a network to the particular printing device.

18. The apparatus as recited in claim 17, wherein the print driver is further configured to query each printing device in the set of one or more printing devices to determine the current configuration of each printing device.

19. The apparatus as recited in claim 18, wherein the print driver selecting, from the set of one or more printing devices based upon the settings data, a best fit printing device that is best able to process the print data includes the print driver selecting the best fit printing device based upon both the current configuration of each printing device from the set of one or more printing devices and the settings data.

20. The apparatus as recited in claim 19, wherein the print driver selecting the best fit printing device based upon both the current configuration of each printing device from the set of one or more printing devices and the settings data includes determining whether the one or more user-specified settings indicated by the settings data are supported by each printing device from the set of one or more printing devices.

21. The apparatus as recited in claim 17, wherein the print driver updating the graphical user interface to identify both the set of one or more printing devices and the best fit printing device includes selecting display attributes of the graphical user interface so that the best fit printing device is visually distinguished from other printing devices in the set of one or more printing devices.

22. The apparatus as recited in claim 17, wherein the graphical user interface allows the user to specify that the particular printing device is to be saved to a favorites list.

23. The apparatus as recited in claim 22, wherein:
- the graphical user interface further allows the user to select a printing device from the list of favorites and request a current status for the selected printing device;
- in response to detecting the user request for the current status for the selected printing device, the universal print driver querying the selected printing device for current status and updating the graphical user interface to reflect the current status of the selected printing device.

24. The apparatus as recited in claim 17, wherein:
- the graphical user interface allows the user to enter data that identifies the particular printing device and allows the particular printing device to be used without the user having to select the search option.

* * * * *